Aug. 25, 1970   J. P. WIERZBINSKI   3,525,966
ENCAPSULATED COIL AND METHOD OF MAKING SAME
AND SPACER FOR USE DURING ENCAPSULATION
Filed July 24, 1968   2 Sheets-Sheet 1

INVENTOR.
Jerome P. Wierzbinski,
BY John H. Leonard,
his ATTORNEY.

INVENTOR.
Jerome P. Wierzbinski
BY John H. Leonard
his ATTORNEY.

United States Patent Office 3,525,966
Patented Aug. 25, 1970

3,525,966
ENCAPSULATED COIL AND METHOD OF MAKING SAME AND SPACER FOR USE DURING ENCAPSULATION
Jerome P. Wierzbinski, Fort Wayne, Ind., assignor to Square D Company, Park Ridge, Ill., a corporation of Michigan
Filed July 24, 1968, Ser. No. 747,374
Int. Cl. H01j 27/02, 27/30
U.S. Cl. 336—205                                9 Claims

ABSTRACT OF THE DISCLOSURE

The spacer comprises a thin wall annulus which is adapted to fit snugly within the central passage of an electric coil in coaxial relation to the central passage. The annulus has radially inwardly extending circumferentially spaced ribs or protuberances adapted to engage the core of an encapsulating mold and position the spacer and thereby the coil with the exterior and interior peripheral walls in proper spaced relation to the corresponding walls of the mold during encapsulation. Each spacer has radial fingers at one end which engage the end of the coil and space its end wall properly from the end wall of the mold. One spacer is inserted in each end of the coil.

The coil is then disposed in the mold held by the spacers in proper position. While held in this position, flowable encapsulating material is poured into the mold, and flows past the spacers so that it also fills all of the space between the coil, and the core and wall of the mold, completely embedding and incorporating the spacers.

---

This invention relates to encapsulated electric coils and to a method of making same, and specifically to a spacer for holding the coil in proper position within a mold during encapsulation.

Heretofore coils have been made by winding the insulated wire into a multilayer coil with sheet insulation material between the layers for support and dielectric strength, and then encapsulating the coil. The improvement of the wire insulation materials has led to winding of the insulated wire directly upon a central tube or spool which provides the support for the coil, the wires being cemented together by varnish or the like during winding or being impregnated after winding. The resultant coil is then encapsulated.

The present invention is directed toward the manufacture of more compact coils.

One of the problems heretofore presented in encapsulation is proper spacing of the coil from the walls of the mold and core piece and to prevent the formation of pin holes or voids in the encapsulating material, without increasing appreciably the bulk of the coil or the space occupied by it.

In accordance with the present invention, a spacer is provided which engages the end walls of the mold and the core, properly spaces the coil with respect to the core and mold walls, and which becomes incorporated in the encapsulating material during the encapsulating operation.

Specific advantages of the invention will become apparent from the following description wherein reference is made to the drawings, in which.

Figure 1:
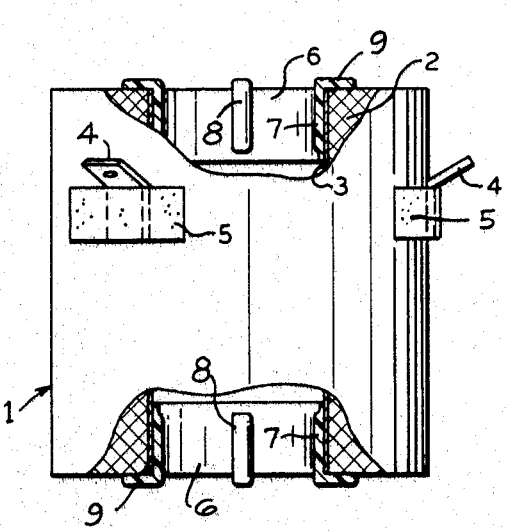
FIG. 1 is a front elevation of a coil with the spacers of the present invention installed preparatory to encapsulation of the coil, part thereof being shown in section for clearness in illustration.

Referring to the drawings, the coil 1 illustrated in FIG. 1 is circular in section, in a plane normal to its axis. It is comprised of a plurality of layers of insulated wire 2. The wire is wound about a central thin walled spool 3 which preferably is of paper and which acts as a support. Generally in winding such coils, either insulating paper is placed between the adjacent layers of the wire or, as in the present case, varnish or insulating settable bonding material is wiped onto the wire during winding for bonding the layers together. Terminals 4, connector portions of which are to be exposed outside of the encapsulation material of the encapsulated coil, are connected to the terminals of the wire and then secured in place on the exterior surface of the coil by suitable means, such as adhesive tape 5. The coil thus provided is then ready for encapsulation. The tube 3 may be allowed to remain in the coil, but, on the other hand, it may be removed after the solidification of the initially applied bonding material onto the wires, as after hardening of the bonding material, the coil becomes self-supporting.

Figure 2:
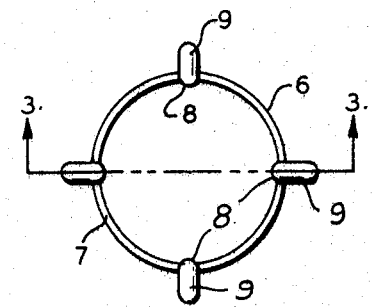
FIG. 2 is a top plan view of one of the spacers.
Figure 3:
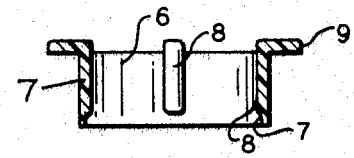
FIG. 3 is a longitudinal sectional view of the spacer illustrated in FIG. 2 and is taken on the line 3—3 thereof.
Figure 4:
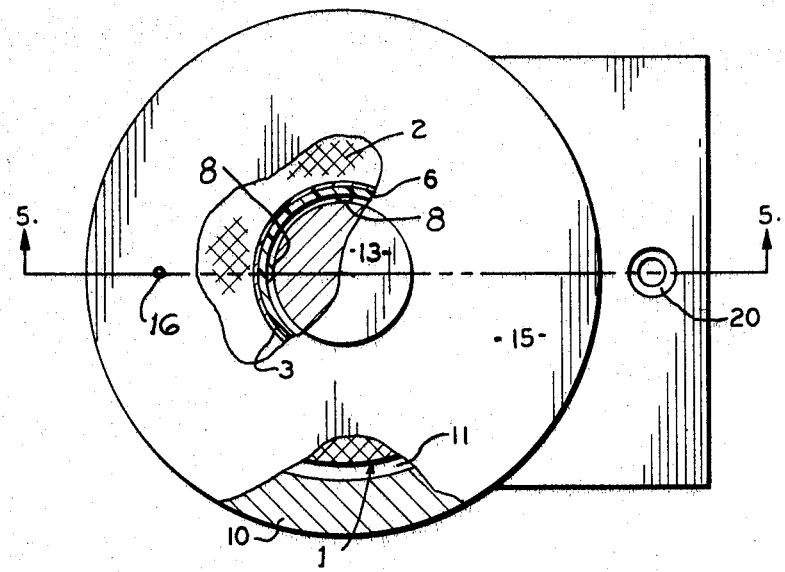
FIG. 4 is a top plan view of a mold with the coil of FIG. 1 installed therein preparatory to encapsulation, part of the top of the mold being broken away for clearness in illustration.

In order to locate the coil properly in the mold and to hold it in the proper position during encapsulation, spacers 6, as best illustrated in FIGS. 2 and 3, are provided. Each spacer 6 comprises a body 7 which preferably is in the form of a thin annular wall having an external cross-section to fit within the passage at the end of the coil or tube 3 when preset therein sufficiently tightly to hold its position during subsequent handling.

The body 7 is provided with a plurality of inwardly projecting protuberances which may be in the form of longitudinal ribs 8 spaced apart from each other circumferentially of the wall 7 and extending a substantial distance in a direction endwise of the body 7. The ribs 8 are centering ribs which engage the mold core and center the insert, and thereby the coil, relative to the core. The ribs 8, in the case of a circular core piece, are of course of equal thickness radially. Each spacer 6 is also provided at one end with spacing fingers 9. The fingers 9 preferably extend radially from the axis of the annular wall 7 outwardly so that when the insert is snugly fitted within the end of a passage through the coil, the fingers engage the end wall of the coil for spacing the coil axially from the adjacent end wall of the mold. The fingers 9 are of equal dimension to each other endwise of the coil and their thickness determines the thickness of encapsulation at the associated end of the coil. The ribs 8 and fingers 9, in addition to the function of positioning the coil, assure spaces between adjacent ribs and between adjacent fingers through which the encapsulating material can flow to, and cover the interior of the coil, as well as its ends and periphery.

The spacers 6 preferably have an external diameter greater than their length and extend only partway into their associated ends of the coils. The spacers 6 are press-fitted into place preparatory to installing the coil in the mold.

Figure 5:
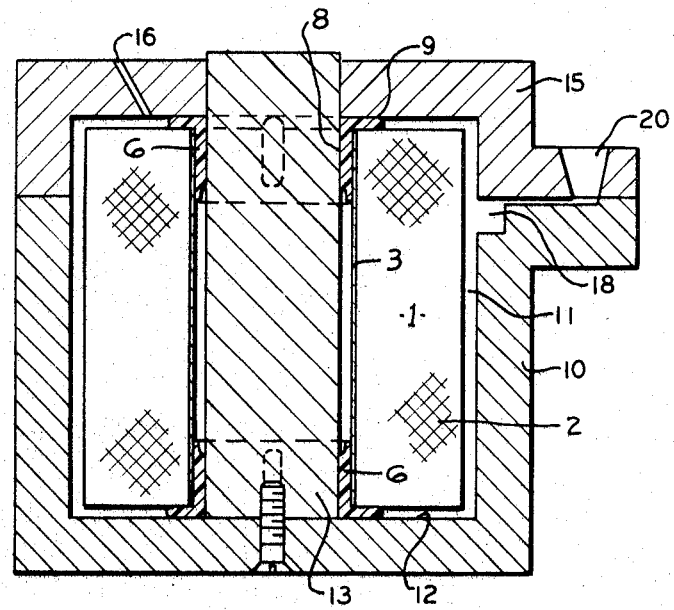
FIG. 5 is a longitudinal sectional view of the mold and coil as illustrated in FIG. 4 and is taken on the line 5—5 of FIG. 4.

As best illustrated in FIG. 5, the mold comprises a female or cavity portion 10 having a cavity 11 therein and a bottom wall 12. Mounted on the bottom wall 12, and coaxial therewith, is a core 13. The mold is closed at the top by a cover plate 15, which may have an air vent 16 through which air can escape. The core piece 13 extends from the bottom wall 12 to the inner face of the top plate. The cavity 11 is shaped, as indicated at 18, to form an external mounting portion on one side of the encapsulated coil, near its upper end, and to provide greater thicknesses, indicated at 19, of the encapsulating material adjacent the terminals 4 to anchor them firmly in position.

With the coil thus mounted in the mold and the top plate 15 in place, the coil is held by the spacers with its outer periphery spaced radially inwardly a uniform distance from the peripheral wall of the cavity 11, and with its ends spaced accurately, by the fingers 9, from the end wall 12 of the cavity and from the under face of the plate 15. At the same time, due to engagement of the core piece 13 with the ribs 8, not only is the coil centered properly in the mold cavity, but the space between the adjacent ribs 8 affords easy access of encapsulating material into the space between the core piece 13 and the inner periphery of the coil, whether this inner periphery be the inner layer of the insulated wire or the usual thin paper tube 3 overlying the inner layer.

For convenience, the mold is gated at the portion 18, provided with a filling spout or spout hole 20 so that the encapsulating material in liquid form can be poured thereto. After pouring, the encapsulating material is allowed to stand until set, after which the coil is removed from the mold.

The spacers 6 preferably are made of the same composition that is to be used for encapsulation, but must be made of a composition, preferably of a synthetic organic plastic material, which is compatible with the material used for encapsulation and which, when the coil is encapsulated, is embedded and incorporated in the encapsulating material as a unitary part of the structure.

Figure 6:
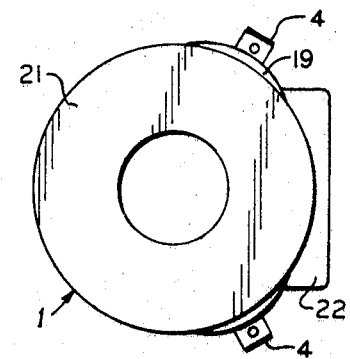
FIG. 6 is a top plan view of the encapsulated coil on a reduced scale.
Figure 7:
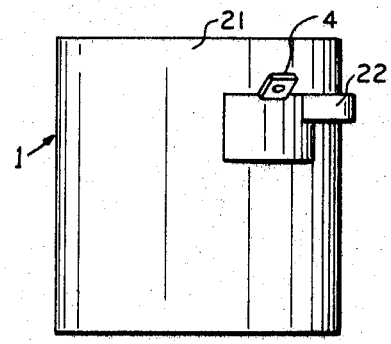
FIG. 7 is a front elevation of the encapsulated coil illustrated in FIG. 6.

The encapsulated coil is illustrated in FIG. 6, the encapsulating material being indicated at 21. It is to be noted that the entire exposed surface of the coil, inner end portions of the terminals, and the spacers are entirely encapsulated, and an integral positioning lug 22 is provided by the encapsulating material itself.

Figure 8:
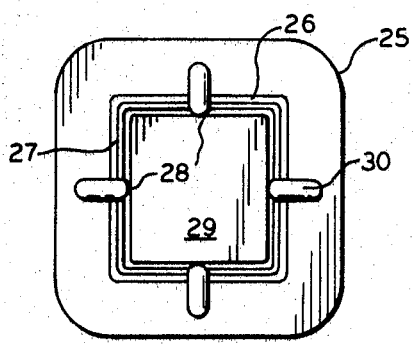
FIG. 8 is a top plan view of a coil similar to the coil illustrated in FIG. 1 showing a spacer in place, the coil being rectilinear in section in a plane normal to its axis.

The annular coil above described is one which is circular in cross section in a plane normal to its axis. The invention is equally applicable to annular coils other than circular in section. For example, a coil 25 which is substantially square in section in a plane normal to its axis is illustrated in FIG. 8 and employs a spacer 26, similar to the spacers heretofore described, except that its peripheral wall, indicated at 27, is of a corresponding square shape. The spacer 26 has ribs 28 which are positioned to engage a correspondingly shaped core 29 and space the coil properly with respect to the core, as well as with respect to the inner peripheral wall of the mold. Fingers 30, similar to the fingers 9 heretofore described, are provided for engaging the end of the coil.

Figure 9:
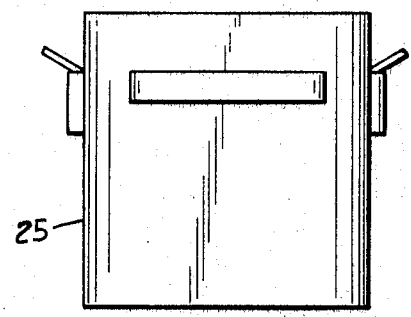
FIG. 9 is a front elevation on a reduced scale of the coil of FIG. 8 after encapsulation.

The coil of FIG. 8, in encapsulated condition is illustrated in FIG. 9.

Coils made in accordance with the present invention are extremely compact, the encapsulating material is of the proper amount and thickness over the entire surface of the coil, and the material is free of voids, air bubbles, and the like.

Having thus described my invention, I claim:

1. A spacer for positioning an annular coil of insulated wire in a mold during encapsulation of the coil and comprising:

a relatively stiff annular body having a peripheral wall and a central passage extending endwise of, and through, the body and coaxial with the wall;

a plurality of centering protuberances integral with the wall and spaced apart from each other circumferentially of the axis of the central passage and extending into said passage;

said body having outwardly facing centering portions intermediate its ends; and said body having a plurality of integral spacing fingers one end spaced apart from each other circumferentially of said axis and distributed in a row extending about said axis with circumferential spaces between at least some fingers unobstructed radially by the peripheral wall, and extending in a direction outwardly from the central passage of the body beyond said peripheral wall, said fingers being narrow circumferentially of said axis and having surface portions, respectively, which face toward the other end of the body and lie in a common plane normal to said axis of the passage and which are the portions of the fingers closest to said one end, and said fingers having other surface portions facing in the opposite direction from the first mentioned surface portions and lying in a common plane spaced from the first mentioned plane in a direction away from said one end and which are the portions farthest from said one end and said fingers being thin in a direction normal to said planes.

2. A spacer according to claim 1 wherein said wall is thin; the protuberant portions are ribs on, and protruding inwardly from, the inner peripheral face of the said peripheral wall, and the finger portions are at one end of said wall and extend generally radially outwardly from the axis of the central passage.

3. A spacer according to claim 2 wherein each rib has one end disposed at said one end of the body and each finger at its inner end is joined to said one end of an associated one of the ribs and is integral therewith and with the wall.

4. A spacer according to claim 2 wherein the annulus is circular in section in a plane normal to the axis of the central passage and is of a length less than its diameter.

5. A spacer according to claim 1 wherein all of the finger portions are of equal overall thickness in a direction endwise of the body.

6. A spacer according to claim 1 wherein the spacer is a one-piece molded structure of synthetic organic plastic material.

7. An encapsulated electrical coil comprising an annular coil of a plurality of turns of insulated electrical conductor;

one-piece spacers of moldable plastic material in set condition in the ends of the coil, respectively, each spacer having peripheral wall portions engaging the inner peripheral wall of the coil near the associated end of the coil and positioning the spacer in coaxial relation to the coil;

each spacer having a plurality of centering protuberances extending inwardly toward the axis of the coil and spaced apart from each other circumferentially of said axis, each spacer having a plurality of finger portions extending outwardly from the axis of the coil and juxtaposed against the adjacent end of the coil, said fingers being of equal thickness in a direction endwise of the coil, said spacers terminating in spaced relation to each other axially of the coil;

terminals connected to the ends of the wire forming the coil;

a unitary body of encapsulating material molded about and encapsulating the coil in its entirety, the inner end portions of the terminals, and the spacers;

said material, at the ends of the coil, having a thickness substantially equal to the thickness of the finger portions and, at the central passage of the coil, extending from the innermost limits of said core centering protuberances to the inner peripheral wall of the coil.

8. The structure according to claim 7 wherein the material of the spacers is moldable plastic in set condition and is compatible with the encapsulating material so as to bond therewith and become incorporated as a substantially unitary portion of the resultant capsule.

9. A method of making an encapsulated electrical coil which comprises:
   winding a strand of insulating wire into a multi-turn annular coil body;
   electrically connecting the ends of the strand of wire to terminals, respectively;
   inserting spacers in the ends of the coil, respectively, each spacer comprising a thin walled body engaging the inner periphery of the coil near its associated end and centering the spacer with respect to the coil axis;
   each spacer having centering protuberances at its inner face for engaging an axial core inserted through the spacers and thereby holding the coil in coaxial relation to the core;
   each spacer also having spacing fingers at its outer end for engaging the adjacent end of the coil and spacing the engaged end from the adjacent end wall of the mold cavity;
   placing the coil in a mold having a core and a cavity, with the protuberances engaging with said core and thereby positively holding the coil in the cavity in preselected spaced relation to the peripheral wall of the cavity, and with the fingers engaging the associated end walls of the coil and of the mold cavity respectively and thereby positively holding the coil in a fixed position axially therein spaced preselected distances from the ends of the cavity, respectively, with the terminals extending outwardly through slots in the mold;
   introducing flowable encapsulating material compatible with that of the inserts into the mold to the extent necessary to fill the spaces between the walls of the mold and the exterior end and peripheral walls of the coil, and the spaces between the core and the inner peripheral wall of the coil, and to embed and bond with the spacers;
   filling the mold with the encapsulating material while the coil is so centered and spaced from the ends of the mold;
   allowing the encapsulating material to solidify; and
   then removing the encapsulated coil, with the spacers incorporated in the material, from the mold.

References Cited

UNITED STATES PATENTS

| | | | |
|---|---|---|---|
| 1,365,014 | 1/1921 | Zwicker | 249—83 X |
| 1,859,390 | 4/1932 | Green | 174—111 X |
| 1,936,470 | 11/1933 | Merrill | 174—111 X |
| 2,856,639 | 10/1958 | Forrest | 264—272 |
| 2,956,312 | 10/1960 | Naimer | 264—272 |
| 3,368,177 | 2/1968 | Hilgers | 336—208 |
| 3,387,245 | 6/1968 | Czernobil | 336—192 |
| 3,388,363 | 6/1968 | Novick | 336—205 |

ELLIOT A. GOLDBERG, Primary Examiner

U.S. Cl. X.R.

29—605; 249—83; 264—272, 275; 336—96, 208